(12) United States Patent
Zhu et al.

(10) Patent No.: US 9,515,689 B2
(45) Date of Patent: Dec. 6, 2016

(54) COMMUNICATION OF POWER CONSUMPTION CONFIGURATIONS DURING HANDOVER

(71) Applicant: INTEL CORPORATION, Santa Clara, CA (US)

(72) Inventors: Jing Zhu, Portland, OR (US); Satish Jha, Hillsboro, OR (US); Rath Vannithamby, Portland, OR (US); Ali Koc, Hillsboro, OR (US); Maruti Gupta, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/125,481

(22) PCT Filed: Jun. 28, 2013

(86) PCT No.: PCT/US2013/048607
§ 371 (c)(1),
(2) Date: Dec. 11, 2013

(87) PCT Pub. No.: WO2014/088649
PCT Pub. Date: Jun. 12, 2014

(65) Prior Publication Data
US 2015/0195800 A1 Jul. 9, 2015

Related U.S. Application Data

(60) Provisional application No. 61/732,851, filed on Dec. 3, 2012.

(51) Int. Cl.
*H04W 4/00* (2009.01)
*H04B 1/12* (2006.01)
(Continued)

(52) U.S. Cl.
CPC .............. *H04B 1/12* (2013.01); *H04B 1/3827* (2013.01); *H04B 7/0452* (2013.01);
(Continued)

(58) Field of Classification Search
CPC ............ H04L 43/065; H04W 76/046; H04W 36/0055; H04W 52/0235; H04W 28/0268
See application file for complete search history.

(56) References Cited

U.S. PATENT DOCUMENTS

| | | | | |
|---|---|---|---|---|
| 2014/0071872 A1* | 3/2014 | Guo | .................. | H04W 52/0261 370/311 |
| 2015/0223166 A1* | 8/2015 | Keskitalo | .......... | H04W 52/0212 370/311 |

(Continued)

OTHER PUBLICATIONS

International Search Report and Written Opinion received for PCT Patent Application No. PCT/US2013/048607, mailed on Oct. 17, 2013, 11 pages.

(Continued)

*Primary Examiner* — Alvin Zhu
(74) *Attorney, Agent, or Firm* — Thorpe North & Western LLP

(57) ABSTRACT

Technology for communicating user equipment (UE) power consumption configurations is disclosed. One method can include selecting, at the UE, a Power Preference Indication (PPI) state of a power consumption configuration of the UE. The UE can receive, from a source evolved node B (eNB), instructions to begin a PPI Prohibit Event Interval during a handover from the source eNB to a target eNB, wherein the UE cannot send the PPI state to the source eNB during the PPI Prohibit Event Interval. The UE can send the PPI state to the target eNB after the PPI Prohibit Event Interval ends and handover has either successfully completed or failed from the source eNB to the target eNB.

22 Claims, 9 Drawing Sheets

(51) Int. Cl.

| | |
|---|---|
| *H04W 72/12* | (2009.01) |
| *H04B 1/3827* | (2015.01) |
| *H04W 84/18* | (2009.01) |
| *H04W 92/18* | (2009.01) |
| *H04W 72/04* | (2009.01) |
| *H04L 5/00* | (2006.01) |
| *H04W 36/10* | (2009.01) |
| *H04W 52/40* | (2009.01) |
| *H04W 76/04* | (2009.01) |
| *H04J 11/00* | (2006.01) |
| *H04W 72/08* | (2009.01) |
| *H04W 76/02* | (2009.01) |
| *H04W 52/02* | (2009.01) |
| *H04L 1/00* | (2006.01) |
| *H04W 24/02* | (2009.01) |
| *H04L 25/02* | (2006.01) |
| *H04B 7/04* | (2006.01) |
| *H04B 7/06* | (2006.01) |
| *H04B 7/155* | (2006.01) |
| *H04L 1/18* | (2006.01) |
| *H04W 84/04* | (2009.01) |
| *H04L 27/00* | (2006.01) |

(52) U.S. Cl.
CPC ....... *H04B 7/0617* (2013.01); *H04B 7/15557* (2013.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0048* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/0206* (2013.01); *H04W 24/02* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04L 5/0007* (2013.01); *H04L 5/0053* (2013.01); *H04L 27/0008* (2013.01); *H04W 72/1205* (2013.01); *H04W 84/042* (2013.01); *Y02B 60/50* (2013.01)

(56) References Cited

U.S. PATENT DOCUMENTS

2015/0230179 A1* 8/2015 Gupta .................. H04W 28/24
 370/311
2015/0257049 A1* 9/2015 Yavuz .................... H04W 8/20
 455/436

OTHER PUBLICATIONS

Alcatel-Lucent et al., "Correction on Power preference indication", R2-125643, 3GPP TSG RAN WG2 Meeting # 80, New Orleans, Nov. 12-15, 2012, 5 pages.
Catt, "UE Detection of PPI Forwarding During Handover Preparation", R2-125823, 3GPP TSG RAN WG2 Meeting # 80, New Orleans, Nov. 12-15, 2012, 3 pages.
Ericsson et al., "Discussion on handling UE power preference indication upon handover", R2-125818, 3GPP TSG RAN WG2 Meeting # 80, New Orleans, Nov. 12-15, 2012, 2 pages.
Ericsson et al., "Discussion on the existence and operation of the PPI prohibit timer", R2-125604, 3GPP TSG RAN WG2 Meeting # 80, New Orleans, Nov. 12-16, 2012, 3 pages.
Renesas Mobile Europe, "UE Behaviour during a Reconfiguration of a PPI Timer", R2-125809, 3GPP TSG RAN WG2 Meeting # 80, New Orleans, Nov. 12-16, 2012, 2 pages.
3GPP TS 36.331 V11.1.0, Technical Specification Group Radio Access Network; Evolved Universal Terrestrial Radio Access (E-UTRA); Radio Resource Control (RRC); Protocol specification, Release 11, Sep. 2012, pp. 1-325.
3GPP TS 36.321 V11.0.0, Technical Specification Group Radio Access Network; Evolved Universal Terrestrial Radio Access (E-UTRA); Medium Access Control (MAC) protocol specification, Release 11, Sep. 2012, pp. 1-55.

* cited by examiner

COMMUNICATION OF POWER CONSUMPTION CONFIGURATIONS DURING HANDOVER

RELATED APPLICATIONS

The present application claims priority to U.S. Provisional Patent Application No. 61/732,851, filed Dec. 3, 2012, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
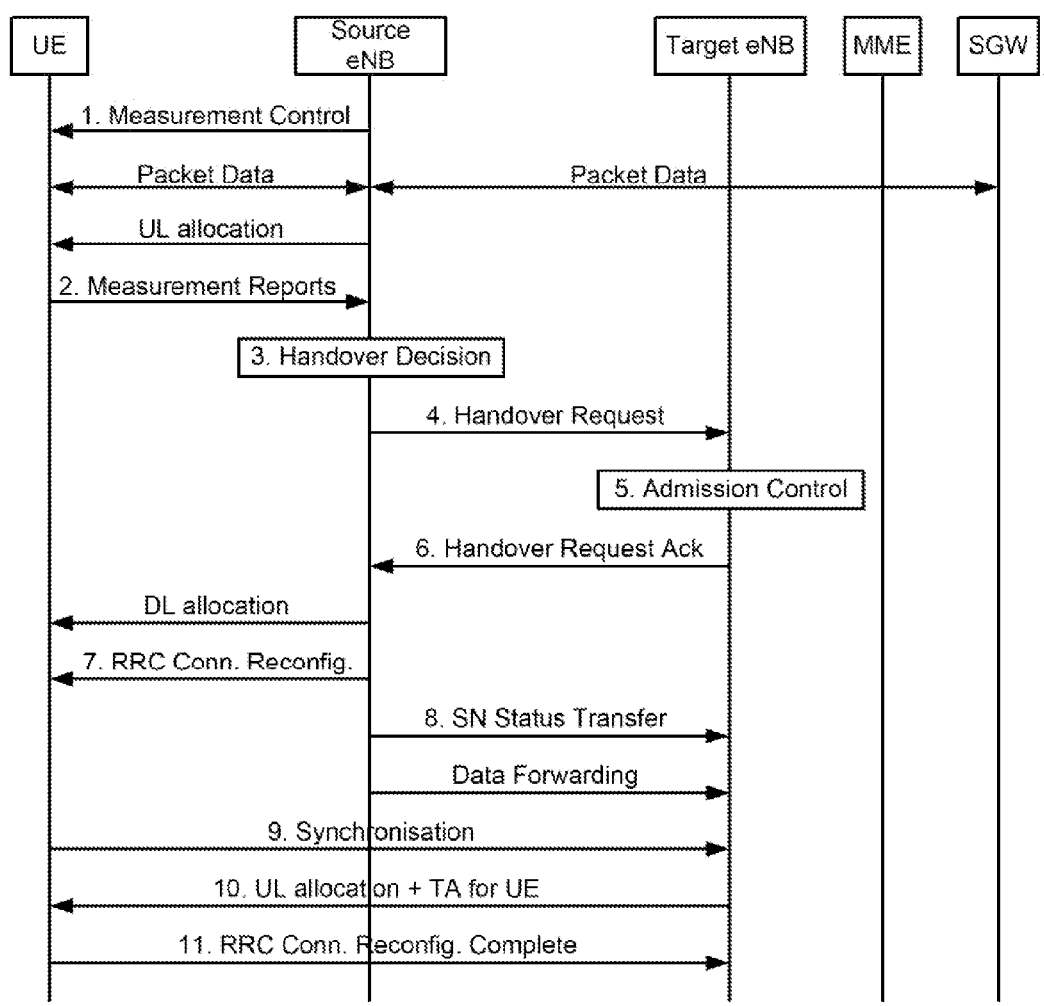
FIG. 1 illustrates a handover procedure as described in the Third Generation Partnership Project (3GPP) Technical Specification (TS) 36.300 in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In Third Generation Partnership Project (3GPP) Long Term Evolution (LTE) Release 11, a user equipment (UE) may send a power preference indication (PPI) to an evolved node B (eNB). The PPI may be one-bit UE assistance information that improves the UE's power efficiency in the context of background traffic. In other words, the UE may communicate its preferred power consumption configuration (i.e., PPI information) to the eNB. A PPI value of 0 may be a default configuration that represents a preferred UE power configuration that is optimized for active traffic, such as delay sensitive applications. An active traffic session may include a time period when a user is actively interacting with the UE. A PPI value of 1 may be a lower power consumption configuration that represents a preferred UE power configuration that is optimized for device power saving and is suitable for background traffic. A background traffic session may represent the duration when the user is not directly interacting with the UE. During the background traffic session, applications may run in the background and generate updates, notifications, etc. The UE may send the PPI state or PPI value (i.e., the preferred power consumption configuration) to the eNB, and then the eNB may set or establish the UE's power consumption configuration based on the PPI state sent from the UE.

However, frequent PPI reports from the UE to the eNB may cause excessive Radio Resource Control (RRC) signaling. Thus, according to 3GPP Technical Specification (TS) 36.300 Release 11, the UE may not send the same preferred power consumption configuration consecutively to the eNB. A prohibit timer (e.g., timer T340) may be used to limit PPI reporting from the UE to the eNB. For example, the UE cannot send a PPI value of 1 to the eNB if the UE is already in a low power consumption configuration (i.e., the UE's previous preferred power consumption configuration was also PPI=1). The prohibit timer can be used to avoid excessive signaling overhead due to unnecessarily frequent transmission of the PPI from the UE to the eNB. After sending a PPI value of 0 to the eNB, the UE can start the timer T340, so that the UE can send a next PPI state (e.g., PPI=1) after expiry of the T340 timer.

During handover, a UE that is communicating with a source eNB may be handed over to a target eNB (i.e., the UE may communicate with the target eNB after the handover). If the target eNB supports PPI functionality, then the PPI state of the UE may be retained at the target eNB. For example, the source eNB may communicate to the target eNB that the PPI state of the UE is 1, so that after the handover occurs, the target eNB knows that the preferred power consumption configuration of the UE is PPI=1. However, the PPI state of the UE after handover occurs (i.e., to the PPI state known at the target eNB) may be inconsistent with the actual PPI state of the UE.

In one example, the source eNB may initiate a handover request process with the target eNB. At the beginning of the handover request process, the PPI state of the UE may be PPI=0, so the source eNB may send PPI=0 to the target eNB. During the handover process (i.e. before the handover process between the source eNB and the target eNB is complete), the UE may desire a lower power consumption configuration and send PPI=1 to the source eNB. In particular, the UE may send PPI=1 to the source eNB before the UE receives instructions to detach from the source eNB and synchronize with the target eNB. The source eNB may not transfer the most recent PPI state of the UE (i.e., PPI=1) to the target eNB because the source eNB has already communicated UE context information to the target eNB. Thus, the target eNB may configure the UE for PPI=0 after handover, even though the most recent PPI state of the UE is PPI=1.

After handover is established, the UE may wish to send its preferred power consumption configuration (i.e., PPI=1) to the new source eNB (i.e., the target eNB of the handover procedure). However, 3GPP Technical Specification (TS) 36.300 Release 11 may prohibit the UE from sending the same PPI state consecutively. Thus, the UE may not send PPI=1 to the target eNB and as a result, the UE may remain in the default state (i.e., PPI=0) for the entire RRC connected state. As will be described in greater detail below, an incorrect PPI setting that results from handover may be mitigated by at least one of: defining a PPI Prohibit Event Interval, communicating a most recent PPI state to the target eNB using a sequence number (SN) status transfer message, or communicating a last sent PPI message to the target eNB using a Radio Resource Control (RRC) Connection Reconfiguration Complete message.

FIG. 1 illustrates a handover procedure between a source eNB and a target eNB, as described in 3GPP Technical Specification (TS) 36.300 Release 11. At step 1, the source eNB may configure UE measurement procedures according to area restriction information. The source eNB may communicate measurements to the UE that assist the function controlling the UE's connection mobility. At step 2, the UE may communicate a measurement report to the source eNB. At step 3, the source eNB may make a handover decision (i.e., the source eNB may decide to hand the UE to a target eNB) based on the measurement report and Radio Resource Management (RRM) information.

At step 4, the source eNB may communicate a handover request message to the target eNB. The handover request message may include the necessary information to prepare for the handover at the target side, such as E-UTRAN Radio Access Bearer (E-RAB) quality of service (QoS) information. At step 5, admission control may be performed by the target eNB dependent on the received E-RAB QoS information to increase the likelihood of a successful handover, if the resources can be granted by the target eNB. The E-RAB may uniquely identify the concatenation of an S1 Bearer and the corresponding Data Radio Bearer. The target eNB may configure the required resources according to the received E-RAB QoS information and reserve a cell radio network temporary identifier (C-RNTI) and optionally a Random Access Channel (RACH) preamble.

At step 6, the target eNB may prepare for handover with a physical layer (i.e., Layer 1, or L1) and a data link layer (i.e., Layer 2, or L2). The target eNB may communicate a handover request acknowledge message to the source eNB. The handover request acknowledge message may include a transparent container to be sent to the UE as an RRC message to perform the handover. The container may include a new C-RNTI, target eNB security algorithm identifiers, a dedicated RACH preamble, and other parameters (e.g., a system information block). As soon as the source eNB receives the handover request acknowledge message from the target eNB, or as soon as the transmission of the handover command is initiated in the downlink, data forwarding may be initiated.

At step 7, the target eNB may generate the RRC message to perform the handover, which may be communicated to the source eNB. The source eNB may communicate the RRC message to the UE. In particular, the RRC message may be a RRC Connection Reconfiguration message that includes mobility control information. The source eNB may perform the necessary integrity protection and ciphering of the RRC message. The UE may receive the RRC Connection Reconfiguration message with the necessary parameters (e.g., a new C-RNTI, target eNB security algorithm identifiers, and optionally dedicated RACH preamble). The UE may be instructed by the source eNB to perform the handover. In other words, the UE may be instructed to detach from the source eNB and synchronize to the target eNB (i.e., the new source eNB).

At step 8, the source eNB may communicate a sequence number (SN) status transfer message to the target eNB. The SN status transfer message may convey the uplink packet data convergence protocol (PDCP) SN receiver status and the downlink PDCP SN transmitter status of E-RABs for which PDCP status preservation applies (i.e., for radio link control acknowledged mode, or RLC AM).

At step 9, after receiving the RRC Connection Reconfiguration message that includes the mobility control information, the UE may perform synchronization with the target eNB and then access the target cell via RACH. The UE may access the target cell following a contention-free procedure if a dedicated RACH preamble was indicated in the mobility control information. Alternatively, the UE may access the target cell following a contention-based procedure if no dedicated preamble was indicated in the mobility control information. At step 10, the target eNB may respond to the UE with uplink (UL) allocation and timing advance. At step 11, when the UE has successfully accessed the target cell, the UE may communicate the RRC Connection Reconfiguration Complete message (including a C-RNTI) to the target eNB to confirm the handover. The RRC Connection Reconfiguration Complete message may include an uplink Buffer Status Report to indicate that the handover procedure is completed for the UE. The target eNB may verify the C-RNTI included in the RRC Connection Reconfiguration Complete message. After step 11 occurs, the target eNB may begin communicating user data to the UE.

As an example, the source eNB may initiate the handover process at step 4. At step 4, the PPI of the UE may be 0, so the source eNB may forward PPI=0 to the target eNB in the handover request message. If the UE sends an updated PPI of 1 to the source eNB before step 7 (i.e., when the source eNB sends the RRC Connection Reconfiguration message to the UE), the target eNB may not receive the latest preferred power consumption configuration (i.e., PPI=1) because the source eNB has already sent PPI=0 to the target eNB.

Figure 2:
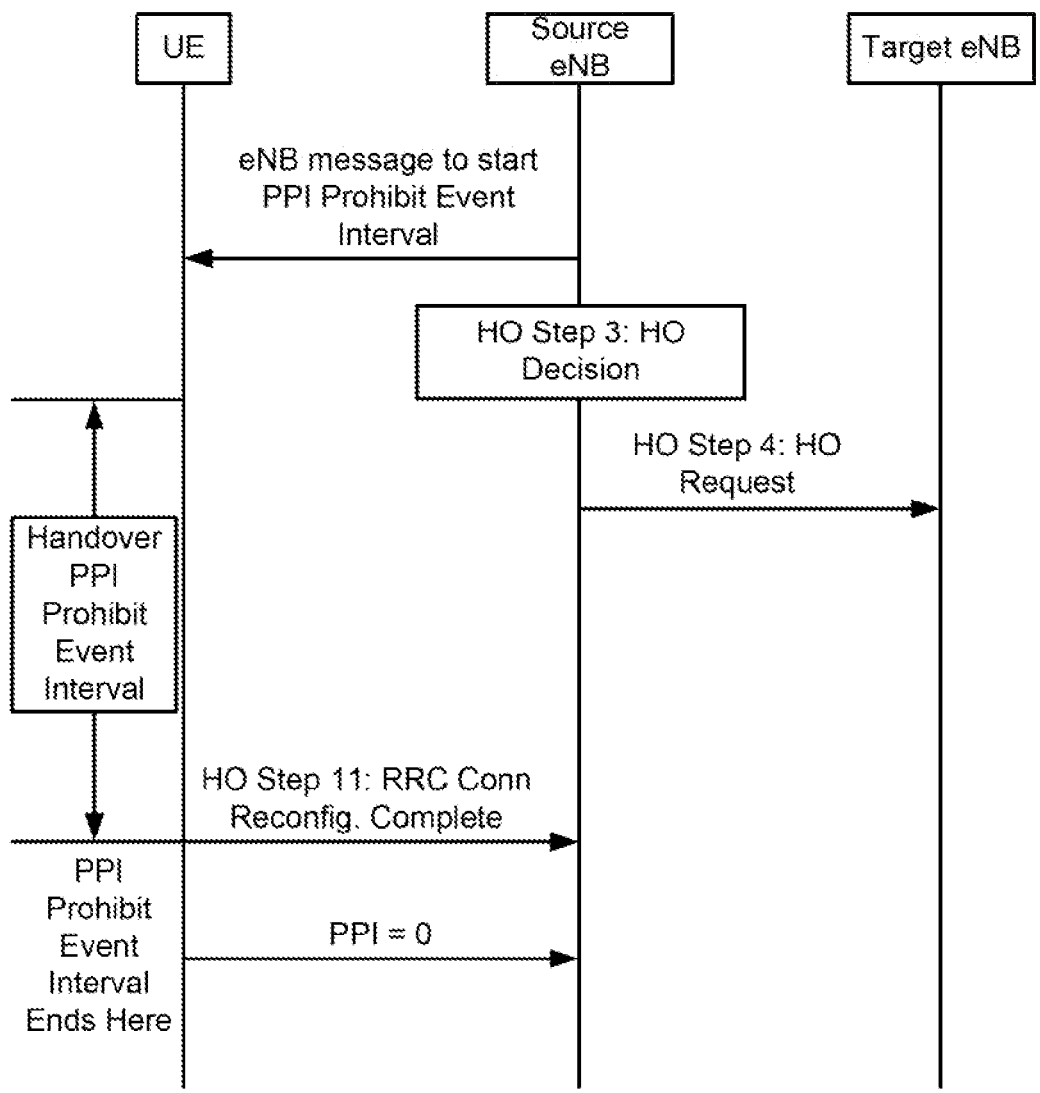
FIG. 2 illustrates a scheme for implementing a Power Preference Indication (PPI) Prohibit Event Interval during a handover from a source evolved node B (eNB) to a target eNB in accordance with an example.

FIG. 2 illustrates a scheme for implementing a Power Preference Indication (PPI) Prohibit Event Interval during a handover from a source evolved node B (eNB) to a target eNB. The PPI Prohibit Event Interval may be used to ensure that the target eNB possesses a most recent PPI state of the UE after handover from the source eNB to the target eNB. In one example, the PPI Prohibit Event Interval may be defined as a period during which the UE shall not send any PPI message to the source eNB. Unlike the timer T340 that defines the minimal time interval for the UE to send a preferred power consumption configuration (e.g., PPI=1) after sending a different preferred power consumption configuration (e.g., PPI=0) to the source eNB as a fixed value, the PPI Prohibit Event Interval may be variable depending on the specific PPI prohibit event.

In one example, the PPI Prohibit Event Interval may be defined to begin at step 4 of the handover procedure illustrated in FIG. 1 and end at step 11 of the handover procedure. The PPI Prohibit Event Interval may begin at step 4 when the source eNB makes a handover decision and communicates a handover request message to the target eNB. The source eNB may initiate the PPI Prohibit Event Interval by sending a medium access control (MAC) message or an RRC message to the UE. The MAC message or the RRC message may signal the start of the PPI Prohibit Event Interval, during which time the UE cannot send any PPI state updates to the source eNB. In addition, the source eNB may instruct the UE to begin the PPI Prohibit Event Interval before the source eNB sends the handover request message to the target eNB.

In one embodiment, the PPI Prohibit Event Interval may end at step 11 when the UE communicates the RRC Connection Reconfiguration complete message to the target eNB. In other words, if handover from the source eNB to the target eNB is successful, then the PPI Prohibit Event Interval automatically ends when the UE communicates the RRC Connection Reconfiguration complete message to the target eNB. After handover is established, if the UE is configured to change its preferred power consumption configuration, the UE may communicate an updated PPI value to the target eNB (i.e., after the UE communicates the RRC Connection Reconfiguration complete message to the target eNB).

In one example, handover failure may occur between the source eNB and the target eNB. Handover failure may result due to radio link failure with the UE or for any number of other reasons. When handover fails, the UE may communicate an RRC Connection Re-Establishment message to the source eNB. The PPI Prohibit Event Interval may automatically end when the UE communicates the RRC Connection Re-Establishment message to the source eNB. Thus, the UE may communicate an updated PPI value to the source eNB after communicating the RRC Connection Re-Establishment message to the source eNB.

In another example, handover failure may occur when the target eNB responds with a handover failure message to the source eNB. In this scenario, the source eNB may communicate a new RRC message to the UE indicating that the PPI Prohibit Event Interval has ended. After receiving the RRC message from the source eNB, the UE may communicate an updated PPI value to the source eNB (rather than the target eNB) if the UE is configured to change its preferred power consumption configuration.

As illustrated in FIG. 2, the source eNB may communicate a message to the UE instructing the UE to start the PPI Prohibit Event Interval. The source eNB may communicate the message to the UE before making a handover decision at step 3. Alternatively, the source eNB may communicate the PPI Prohibit Event Interval message to the UE immediately after making the handover decision at step 3. Step 4 of the handover procedure may occur only after the source eNB ha sent the PPI Prohibit Event Interval message to the UE. The PPI Prohibit Event Interval may begin when the source eNB communicates the message to the UE, during which time the UE cannot send a preferred power consumption configuration (i.e., a PPI state) to the source eNB. In other words, the UE may be prohibited from sending the PPI state to the source eNB during a handover execution phase. At step 4, the source eNB may communicate a handover request to the target eNB. The PPI Prohibit Event Interval may end when the UE communicates a RRC Connection Reconfiguration Complete message to the target eNB (i.e., the new source eNB) at step 11. After the PPI Prohibit Interval ends, the UE may communicate an updated PPI state to the target eNB (i.e., the new source eNB).

Figure 3:
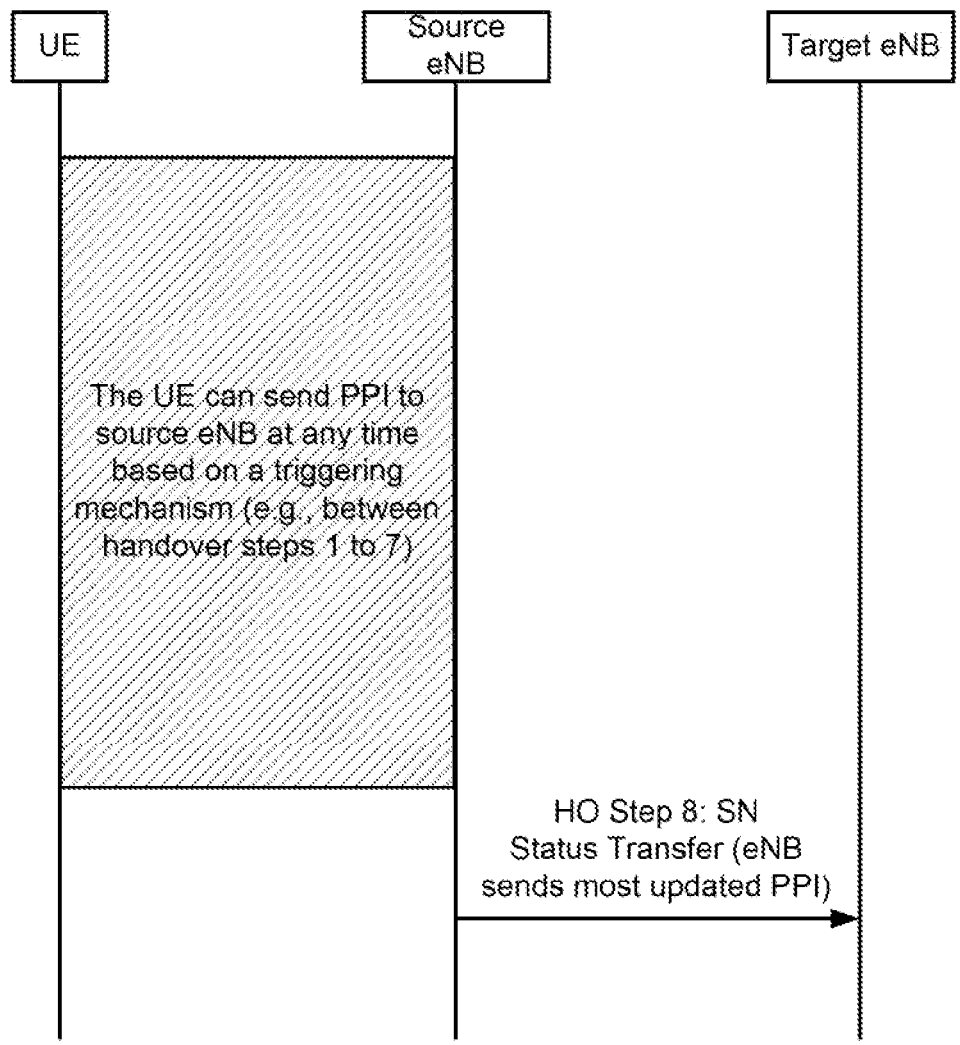
FIG. 3 illustrates a scheme for communicating a most recent Power Preference Indication (PPI), from a source evolved node B (eNB) to a target eNB, during a handover between the source eNB and the target eNB in accordance with an example.

FIG. 3 illustrates a scheme for communicating a most recent Power Preference Indication (PPI), from a source eNB to a target eNB, during a handover between the source eNB and the target eNB. In particular, the source eNB may communicate the PPI of the UE to the target eNB using a sequence number (SN) status transfer message. As previously discussed, at step 8 of the handover process illustrated in FIG. 1, the source eNB may communicate the SN status transfer message to the target eNB in order to convey the uplink packet data convergence protocol (PDCP) SN receiver status and the downlink PDCP SN transmitter status of E-RABs for which PDCP status preservation applies. By including the PPI in the SN status transfer message, the target eNB may receive the most updated PPI information.

As shown in FIG. 3, the UE may communicate a preferred power consumption configuration to the source eNB according to a UE triggering algorithm. For example, the UE may send the PPI information to the source eNB before a handover execution phase occurs (i.e., before the source eNB sends a handover request message to the target eNB). Alternatively, the UE may send the PPI information during step 1 through step 7 of the handover execution phase based on the triggering algorithm.

The source eNB may append the most updated PPI information received from the UE to the SN status transfer message communicated to the target eNB during step 8 of the handover process. In other words, the SN status transfer message may include the most recent preferred power consumption configuration of the UE. As a result, the target eNB may receive the most recent PPI information of the UE. However, if the UE sends updated PPI information to the source eNB during step 8 to step 11 of the handover process (i.e., after the SN status transfer message is sent to the target eNB), then the target eNB may not receive the updated PPI information along with the SN status transfer message.

Figure 4:
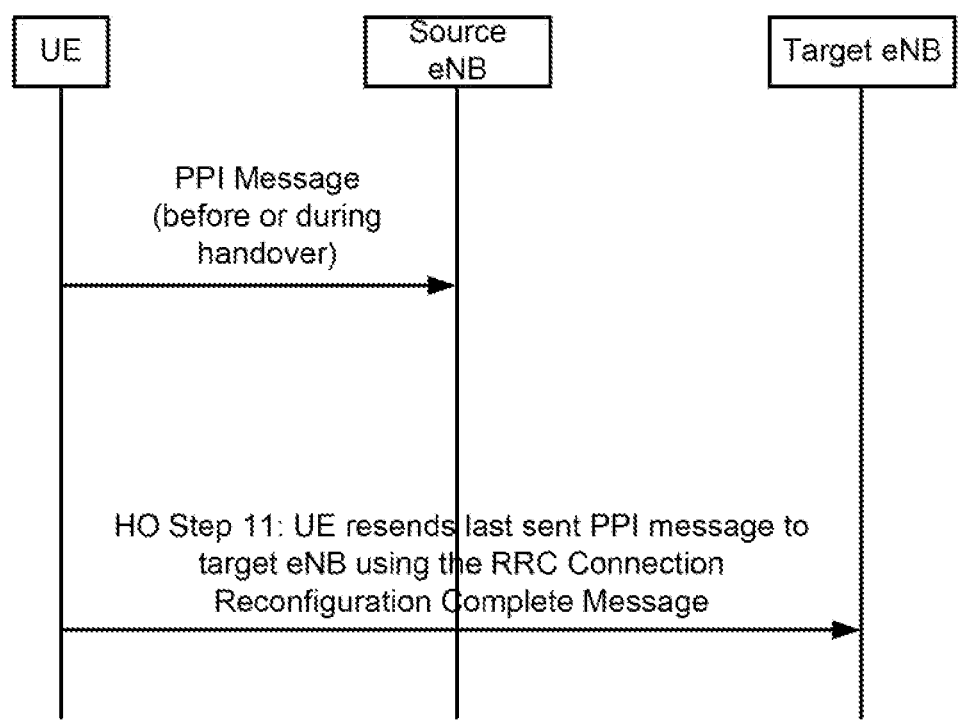
FIG. 4 illustrates a scheme for communicating a most recent Power Preference Indication (PPI), from a user equipment (UE) to a target evolved node B (eNB), during a handover between a source eNB and the target eNB in accordance with an example.

FIG. 4 illustrates a scheme for communicating, at the UE, a most recent Power Preference Indication (PPI) to the target eNB during a handover from the source eNB to the target eNB. The UE may communicate PPI information to the target eNB along with a RRC Connection Reconfiguration Complete message at step 11 of FIG. 1. In particular, the UE may resend the last PPI message that was communicated to the source eNB along with the RRC Connection Reconfiguration Complete message. As previously explained, the UE may communicate the RRC Connection Reconfiguration Complete message in order to confirm the handover. After step 11 occurs, the target eNB may begin sending user data to the UE. By resending the most recent preferred power consumption configuration to the target eNB during step 11, the target eNB may receive the most recent PPI of the UE. However, the UE may communicate the preferred power consumption configuration to the target eNB only if the target eNB is configured to accept PPI information.

In one example, the UE may communicate the last sent PPI message to the target eNB along with the RRC Connection Reconfiguration Complete message, as illustrated at step 11 of FIG. 1. For example, the UE may have sent PPI information to the source eNB during any of steps 1 through step 10 of the handover execution process. Alternatively, the UE may have sent PPI information to the source eNB before the handover execution phase was started between the source eNB and the target eNB (i.e., before the source eNB communicated a handover request message to the target eNB). In addition, the UE may resend its last sent PPI message regardless of the fact that it may be the same PPI message as sent to the source eNB. Furthermore, the UE may communicate PPI information to the target eNB regardless of when the UE last communicated the PPI information to the source eNB (i.e., regardless of the T340 timer). Thus, the UE may resend its last sent PPI message to the target eNB, even when the PPI of the UE was not updated during handover. Alternatively, the UE may communicate PPI information to the target eNB that is different than the PPI information that was previously communicated to the source eNB.

For example, the UE may communicate PPI=0 to the source eNB during step 4 of the handover process illustrated in FIG. 1. In one example, the UE may communicate the PPI information to the source eNB based on a trigger algorithm.

The UE may not update its preferred power consumption configuration during the handover execution process. Nevertheless, the UE may resend PPI=0 along with the RRC Connection Reconfiguration Complete message to the target eNB during step 11. As another example, the UE may communicate PPI=0 to the source eNB before the source eNB initiates a handover execution phase with the target eNB. During the handover execution phase, the UE may update its preferred power consumption configuration to PPI=1. Thus, when the UE resends the PPI information to the target eNB, the UE may communicate the updated PPI information (i.e., PPI=1). Thus, the PPI information communicated to the target eNB may be different than the PPI information previously communicated to the source eNB. As a result, the target eNB may receive the latest PPI information from the UE.

Figure 5:
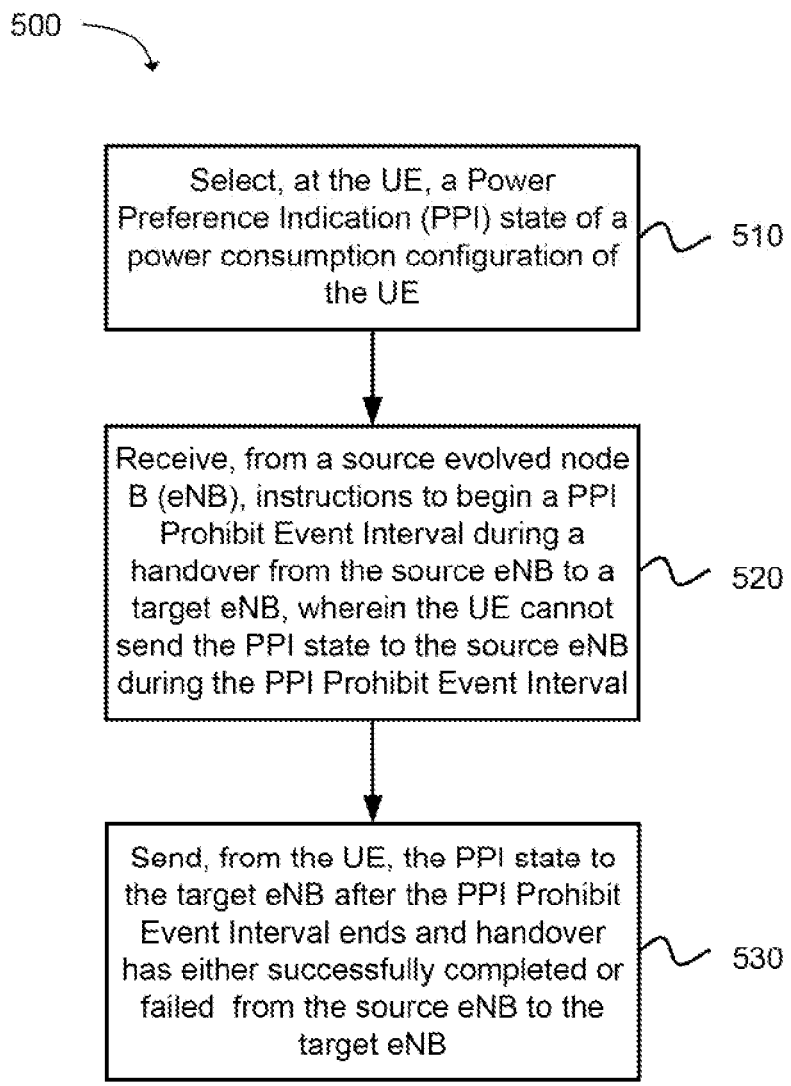
FIG. 5 depicts a flow chart of a method for communicating user equipment (UE) power consumption configurations in accordance with an example.

Another example provides a method 500 for communicating user equipment (UE) power consumption configurations, as shown in the flow chart in FIG. 5. The method may be executed as instructions on a machine, where the instructions are included on at least one computer readable medium or one non-transitory machine readable storage medium. The method includes the operation of selecting, at the UE, a Power Preference Indication (PPI) state of a power consumption configuration of the UE, as in block 510. The method can include receiving, from a source evolved node B (eNB), instructions to begin a PPI Prohibit Event Interval during a handover from the source eNB to a target eNB, wherein the UE cannot send the PPI state to the source eNB during the PPI Prohibit Event Interval, as in block 520. The next operation of the method can include sending, from the UE, the PPI state to the target eNB after the PPI Prohibit Event Interval ends and handover has either successfully completed or failed from the source eNB to the target eNB, as in block 530.

In one example, the method can further include receiving, at the UE, instructions to begin the PPI Prohibit Event Interval before the source eNB sends a handover request message to the target eNB. In addition, the method can include receiving, from the source eNB, a Medium Access Control (MAC) message or a Radio Resource Control (RRC) message that indicates a start of the PPI Prohibit Event Interval.

In another example, the method can further include sending the PPI state to the target eNB, from the UE, after the UE sends a Radio Resource Control (RRC) Connection Reconfiguration Complete message to the target eNB. In addition, the method can include determining that the PPI Prohibit Event Interval ends when the UE sends the RRC Connection Reconfiguration Complete message to the target eNB.

In an additional example, the method can include determining that the PPI Prohibit Event Interval ends when the UE sends a Radio Resource Control (RRC) Connection Re-Establishment message to the source eNB. Furthermore, the method can include sending the PPI state to the source eNB, from the UE, after the UE sends the RRC Connection Re-Establishment message to the source eNB in response to handover not being established between the source eNB and the target eNB.

In one example, the method can include determining that the PPI Prohibit Event Interval ends after receiving a message, from the source eNB, indicating that the PPI Prohibit Event Interval has terminated because handover could not be established between the source eNB and the target eNB. In addition, the method can include sending the PPI state to the target eNB, wherein the power consumption configuration of PPI=0 indicates a default power configuration and the power consumption configuration of PPI=1 indicates a lower power consumption configuration.

Figure 6:
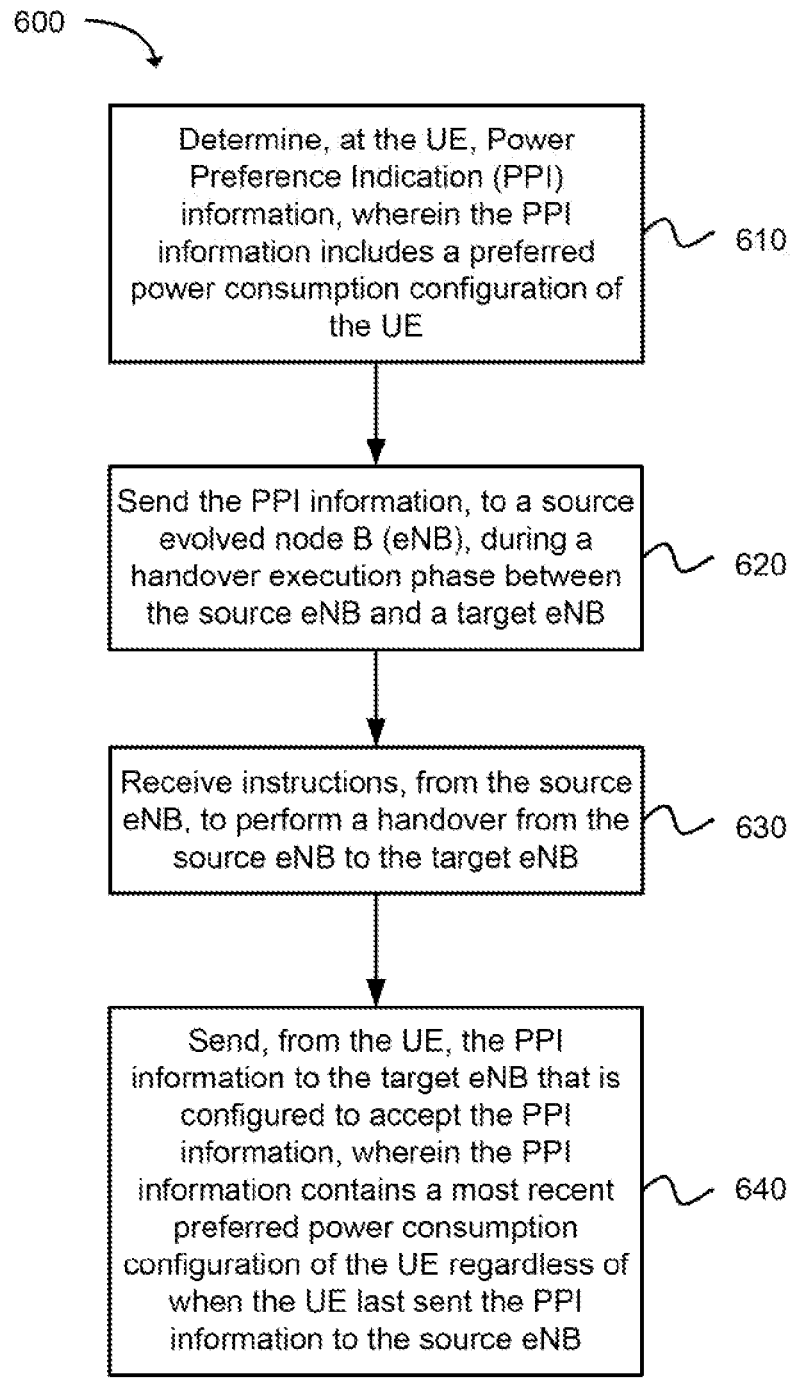
FIG. 6 depicts functionality of computer circuitry of a user equipment (UE) operable to communicate a user equipment (UE) power consumption configuration in accordance with an example.
Figure 7:
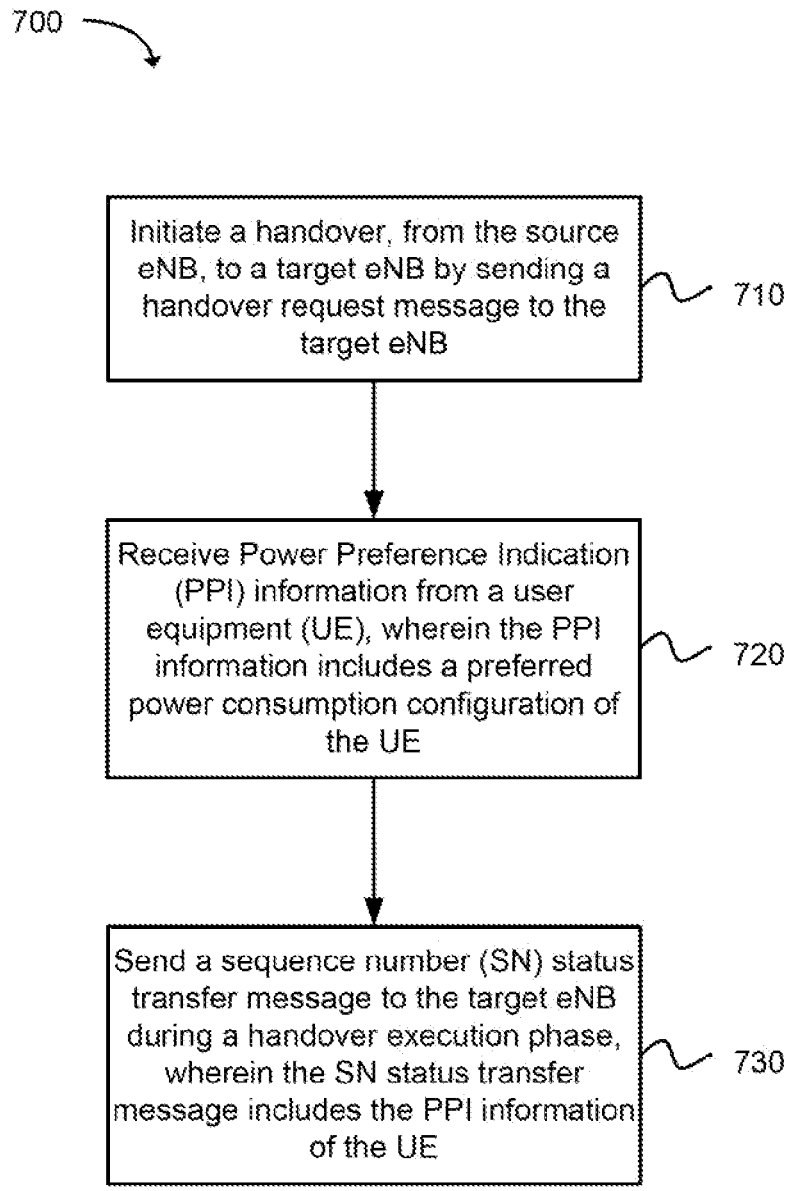
FIG. 7 depicts functionality of computer circuitry of a source evolved node B (eNB) operable to support communication of a power consumption configuration in accordance with an example.

Another example provides functionality 600 of computer circuitry of a user equipment (UE) operable to communicate a UE power consumption configuration, as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to determine, at the UE, Power Preference Indication (PPI) information, wherein the PPI information includes a preferred power consumption configuration of the UE, as in block 610. The computer circuitry can be further configured to send the PPI information, to a source evolved node B (eNB), during a handover execution phase between the source eNB and a target eNB, as in block 620. The computer circuitry can also be configured to receive instructions, from the source eNB, to perform a handover from the source eNB to the target eNB, as in block 630. In addition, the computer circuitry can be configured to send, from the UE, the PPI information to the target eNB that is configured to accept the PPI information, wherein the PPI information contains a most recent preferred power consumption configuration of the UE regardless of when the UE last sent the PPI information to the source eNB, as in block 640.

In one configuration, the computer circuitry can be configured to send the PPI information to the target eNB using a Radio Resource Control (RRC) Connection Reconfiguration Complete message. In another example, the computer circuitry can be configured to send the same PPI information to the target eNB as the PPI information sent to the source eNB. In addition, the computer circuitry can be configured to send PPI information to the target eNB that is different than the PPI information sent to the source eNB in response to the PPI information being updated during the handover execution phase. Furthermore, the computer circuitry can be configured to send PPI information to the source eNB and the target eNB, wherein the preferred power consumption configuration of PPI=0 indicates a default power configuration and the preferred power consumption configuration of PPI=1 indicates a lower power consumption configuration.

Another example provides functionality 700 of computer circuitry of a source evolved node B (eNB) operable to support communication of a power consumption configuration. The functionality may be implemented as a method or the functionality may be executed as instructions on a machine, where the instructions are included on at least one computer readable medium or one non-transitory machine readable storage medium. The computer circuitry can be configured to initiate a handover, from the source eNB, to a target eNB by sending a handover request message to the target eNB, as in block 710. The computer circuitry can be further configured to receive Power Preference Indication (PPI) information from a user equipment (UE), wherein the PPI information includes a preferred power consumption configuration of the UE, as in block 720. The computer circuitry can also be configured to send a sequence number (SN) status transfer message to the target eNB during a handover execution phase, wherein the SN status transfer message includes the PPI information of the UE, as in block 730.

In one configuration, the computer circuitry can be configured to receive the PPI information from the UE based on a UE triggering algorithm. In addition, the computer circuitry can be configured to send a most recent preferred power consumption configuration of the UE along with the SN status transfer message to the target eNB.

Figure 8:
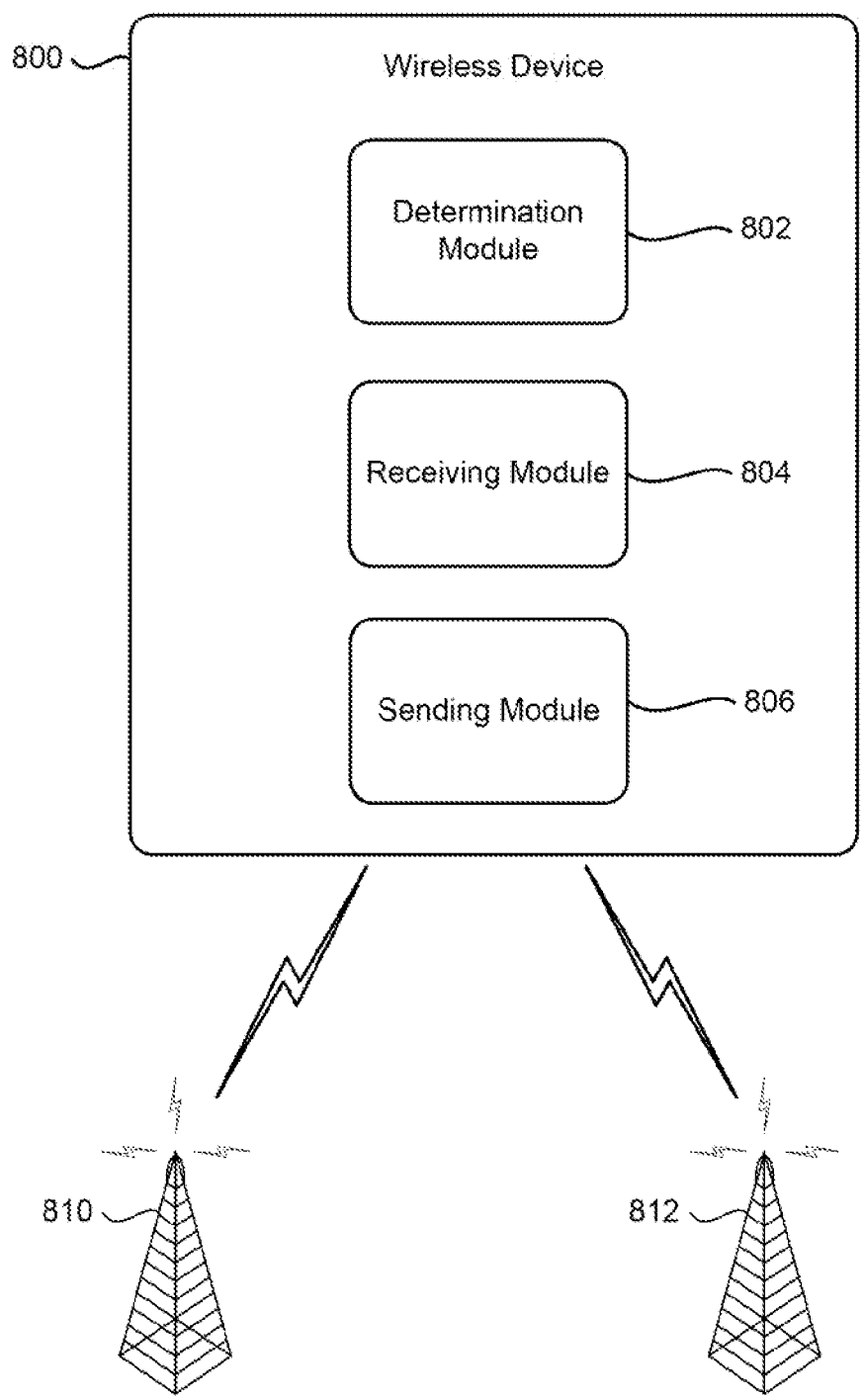
FIG. 8 illustrates a block diagram of a wireless device (e.g. UE) in accordance with an example.

FIG. 8 illustrates an example wireless device (e.g., a UE) 800 that is configured to communicate power consumption configurations, as shown in another embodiment of the present invention. The wireless device comprises a determination module 802 that is configured to determine, at a user equipment (UE), a Power Preference Indication (PPI) state of a preferred power consumption configuration of the UE. A receiving module 804 can be configured to receive, from a source evolved node B (eNB) 810, a message to begin a PPI Prohibit Event Interval during a handover from the source eNB to a target eNB 812, wherein the UE cannot send the PPI state to the source eNB during the PPI Prohibit Event Interval. A sending module 806 can be configured to send, from the UE, the PPI state to the target eNB after the PPI Prohibit Event Interval ends and based on a PPI triggering algorithm that triggers the UE to send the PPI state to the target eNB.

In one example, the receiving module 804 can be configured to receive the message from the source eNB 810 to begin the PPI Prohibit Event Interval before the source eNB sends a handover request message to the target eNB 812.

In another example, the sending module 806 can be configured to send the PPI state to the target eNB 812 after the UE sends a Radio Resource Control (RRC) Connection Reconfiguration Complete message to the target eNB. In addition, the sending module 806 can be configured to send the PPI state to the source eNB 810 after the UE sends a Radio Resource Control (RRC) Connection Re-Establishment message to the source eNB based on handover between the source eNB and the target eNB not being established. Furthermore, the sending module 806 can be configured to send the PPI state to the source eNB after receiving a message from the source eNB indicating that the PPI Prohibit Event Interval has ended in response to handover not being established between the source eNB and the target eNB. In one example, the sending module 806 can be configured to send the PPI state to the target eNB using a Radio Resource Control (RRC) Connection Reconfiguration Complete message.

Figure 9:
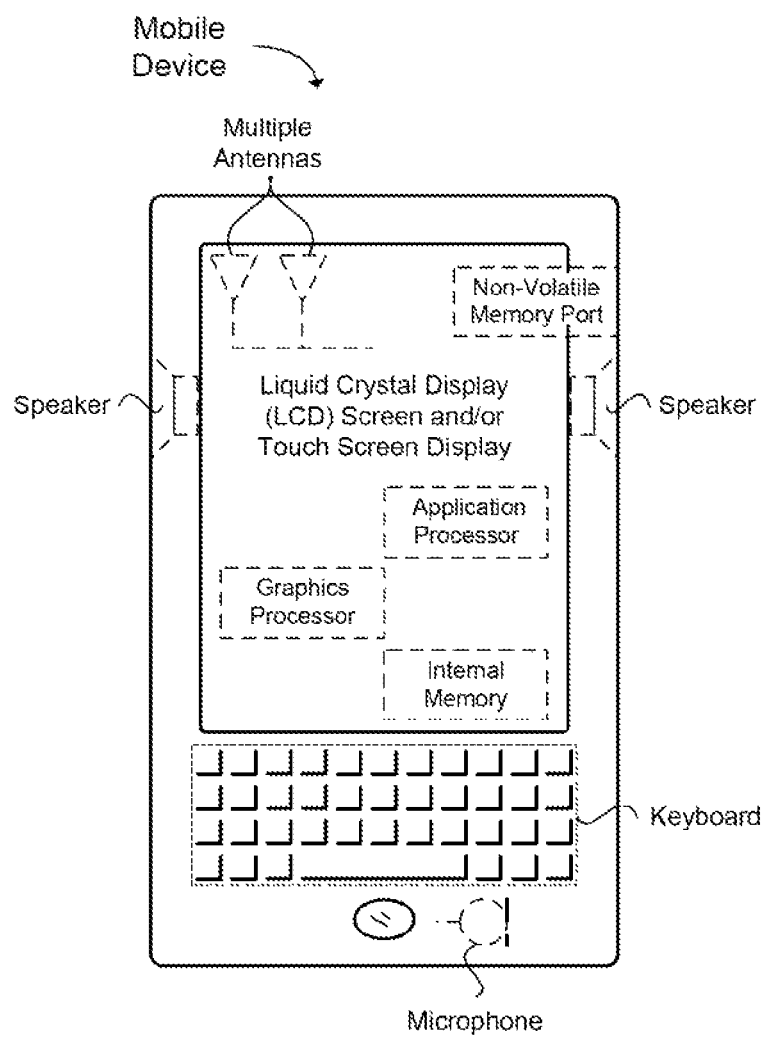
FIG. 9 illustrates a diagram of a wireless device (e.g., UE) in accordance with an example.

FIG. 9 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to communicate a UE power consumption configuration, the UE having computer circuitry configured to:
   determine, at the UE, Power Preference Indication (PPI) information, wherein the PPI information includes a preferred power consumption configuration of the UE;
   send the PPI information to a source evolved node B (eNB);
   receive instructions, from the source eNB, to perform a handover from the source eNB to the target eNB;

receive instructions, from the source eNB, to begin a PPI Prohibit Event Interval during the handover from the source eNB to a target eNB, wherein the UE cannot send the PPI information to the source eNB during the PPI Prohibit Event Interval;

receive, at the UE, the instructions to begin the PPI Prohibit Event Interval before the source eNB sends a handover request message to the target eNB; and send, from the UE, the PPI information to the target eNB that is configured to accept the PPI information, wherein the PPI information contains a most recent preferred power consumption configuration of the UE regardless of when the UE last sent PPI information to the source eNB.

2. The computer circuitry of claim 1, further configured to send the PPI information to the target eNB using a Radio Resource Control (RRC) Connection Reconfiguration Complete message.

3. The computer circuitry of claim 1, further configured to send the same PPI information to the target eNB as the PPI information sent to the source eNB.

4. The computer circuitry of claim 1, further configured to send PPI information to the target eNB that is different than the PPI information sent to the source eNB in response to the PPI information being updated during a handover execution phase.

5. The computer circuitry of claim 1, further configured to send PPI information to the source eNB and the target eNB, wherein the preferred power consumption configuration of PPI=0 indicates a default power configuration and the preferred power consumption configuration of PPI=1 indicates a lower power consumption configuration.

6. A source evolved node B (eNB) operable to support communication of a power consumption configuration, the source eNB having computer circuitry configured to:

receive Power Preference Indication (PPI) information from a user equipment (UE), wherein the PPI information includes a preferred power consumption configuration of the UE;

send instructions to the UE to begin a PPI Prohibit Event Interval during a handover from the source eNB to a target eNB, wherein the UE cannot send the PPI information to the source eNB during the PPI Prohibit Event Interval;

send, to the UE, the instructions to begin the PPI Prohibit Event Interval before a handover request message is sent from the source eNB to the target eNB;

initiate the handover, from the source eNB, to a target eNB by sending the handover request message to the target eNB; and send a sequence number (SN) status transfer message to the target eNB during a handover execution phase, wherein the SN status transfer message includes the PPI information of the UE.

7. The computer circuitry of claim 6, further configured to receive the PPI information from the UE based on a UE triggering algorithm.

8. The computer circuitry of claim 6, further configured to send a most recent preferred power consumption configuration of the UE along with the SN status transfer message to the target eNB.

9. A method of communicating user equipment (UE) power consumption configurations, the method comprising:

selecting, at the UE, a Power Preference Indication (PPI) state of a power consumption configuration of the UE;

receiving, from a source evolved node B (eNB), instructions to begin a PPI Prohibit Event Interval during a handover from the source eNB to a target eNB, wherein the UE cannot send the PPI state to the source eNB during the PPI Prohibit Event Interval;

receiving, at the UE, the instructions to begin the PPI Prohibit Event Interval before the source eNB sends a handover request message to the target eNB; and sending, from the UE, the PPI state to the target eNB after the PPI Prohibit Event Interval ends and handover has either successfully completed or failed from the source eNB to the target eNB.

10. The method of claim 9, further comprising receiving, from the source eNB, a Medium Access Control (MAC) message or a Radio Resource Control (RRC) message that indicates a start of the PPI Prohibit Event Interval.

11. The method of claim 9, further comprising sending the PPI state to the target eNB, from the UE, after the UE sends a Radio Resource Control (RRC) Connection Reconfiguration Complete message to the target eNB.

12. The method of claim 11, further comprising determining that the PPI Prohibit Event Interval ends when the UE sends the RRC Connection Reconfiguration Complete message to the target eNB.

13. The method of claim 9, further comprising determining that the PPI Prohibit Event Interval ends when the UE sends a Radio Resource Control (RRC) Connection Re-Establishment message to the source eNB.

14. The method of claim 13, further comprising sending the PPI state to the source eNB, from the UE, after the UE sends the RRC Connection Re-Establishment message to the source eNB in response to handover not being established between the source eNB and the target eNB.

15. The method of claim 9, further comprising determining that the PPI Prohibit Event Interval ends after receiving a message, from the source eNB, indicating that the PPI Prohibit Event Interval has terminated because handover could not be established between the source eNB and the target eNB.

16. The method of claim 9, further comprising sending the PPI state to the target eNB, wherein the power consumption configuration of PPI=0 indicates a default power configuration and the power consumption configuration of PPI=1 indicates a lower power consumption configuration.

17. At least one non-transitory machine readable storage medium comprising a plurality of instructions adapted to be executed to implement the method of claim 9.

18. A wireless device configured to communicate power consumption configurations, comprising:

a determination module configured to determine, at a user equipment (UE), a Power Preference Indication (PPI) state of a preferred power consumption configuration of the UE;

a receiving module configured to receive, from a source evolved node B (eNB), a message to begin a PPI Prohibit Event Interval during a handover from the source eNB to a target eNB, wherein the UE cannot send the PPI state to the source eNB during the PPI Prohibit Event Interval; and a sending module configured to send, from the UE, the PPI state to the target eNB after the PPI Prohibit Event Interval ends and based on a PPI triggering algorithm that triggers the UE to send the PPI state to the target eNB, wherein the receiving module is further configured to receive the message from the source eNB to begin the PPI Prohibit Event Interval before the source eNB sends a handover request message to the target eNB.

19. The wireless device of claim 18, wherein the sending module is further configured to send the PPI state to the target eNB after the UE sends a Radio Resource Control (RRC) Connection Reconfiguration Complete message to the target eNB.

20. The wireless device of claim 18, wherein the sending module is further configured to send the PPI state to the source eNB after the UE sends a Radio Resource Control (RRC) Connection Re-Establishment message to the source eNB based on handover between the source eNB and the target eNB not being established.

21. The wireless device of claim 18, wherein the sending module is further configured to send the PPI state to the source eNB after receiving a message from the source eNB indicating that the PPI Prohibit Event Interval has ended in response to handover not being established between the source eNB and the target eNB.

22. The wireless device of claim 18, wherein the sending module is further configured to send the PPI state to the target eNB using a Radio Resource Control (RRC) Connection Reconfiguration Complete message.

* * * * *